(12) United States Patent
Miyakawa et al.

(10) Patent No.: US 7,794,807 B2
(45) Date of Patent: Sep. 14, 2010

(54) CONDUCTIVE COMPOSITE SHEETING

(75) Inventors: Takeshi Miyakawa, Isezaki (JP);
Yasushi Hirokawa, Isezaki (JP);
Masahiro Kuramoto, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 20 days.

(21) Appl. No.: 11/574,729

(22) PCT Filed: Sep. 5, 2005

(86) PCT No.: PCT/JP2005/016277
§ 371 (c)(1),
(2), (4) Date: Mar. 6, 2007

(87) PCT Pub. No.: WO2006/028064
PCT Pub. Date: Mar. 16, 2006

(65) Prior Publication Data
US 2007/0231549 A1    Oct. 4, 2007

(30) Foreign Application Priority Data
Sep. 7, 2004    (JP)    ............... 2004-259136

(51) Int. Cl.
B29D 22/00 (2006.01)
B32B 3/00 (2006.01)
B32B 9/04 (2006.01)
H01B 1/06 (2006.01)
C08L 9/00 (2006.01)

(52) U.S. Cl. ............... 428/35.7; 428/172; 428/411.1; 252/511; 525/98

(58) Field of Classification Search ............... 428/172, 428/35.7, 411.1; 252/511; 525/98
See application file for complete search history.

(56) References Cited

U.S. PATENT DOCUMENTS

| | | | | |
|---|---|---|---|---|
| 4,073,831 A | * | 2/1978 | Tabana et al. | ............ 525/98 |
| 4,478,903 A | | 10/1984 | Kishida et al. | |
| 5,707,699 A | * | 1/1998 | Miyakawa et al. | ......... 428/35.7 |
| 5,747,164 A | * | 5/1998 | Miyakawa et al. | ........ 428/411.1 |
| 5,783,294 A | * | 7/1998 | Hiraiwa et al. | ............ 428/215 |
| 6,005,050 A | * | 12/1999 | Okada et al. | ............ 525/68 |
| 2004/0005465 A1 | * | 1/2004 | Oda et al. | ............ 428/422 |

FOREIGN PATENT DOCUMENTS

| | | | |
|---|---|---|---|
| GB | 1428974 A | * | 3/1976 |
| JP | 60-220147 | | 11/1985 |
| JP | 61-28507 | | 2/1986 |
| JP | 61-33132 | | 2/1986 |
| JP | 61-57524 | | 3/1986 |
| JP | 63-4841 | | 1/1988 |
| JP | 63-5401 | | 1/1988 |
| JP | 63-5402 | | 1/1988 |
| JP | 63-299923 | | 12/1988 |
| JP | 01038402 A | * | 2/1989 |
| JP | 9-76422 | | 3/1997 |
| JP | 9-76425 | | 3/1997 |
| JP | 9-174769 | | 7/1997 |
| JP | 11-10806 | | 1/1999 |
| JP | 2003-073541 | | 3/2003 |
| WO | WO 03/057779 A1 | | 7/2003 |

OTHER PUBLICATIONS

Kolawole et al. "Environmental Degradation of Some Polymer Blends. Blends of Polystyrene with Arcrylonitrile Butadiene Styrene, Poly(vinyl chloride), and Polybutadiene and Blends of Polybutadiene with Poly(vinyl Chloride)" Journal of Appled Polymer Science, vol. 27, 2317-2335 (1982).*
English abstract of JP 01038402A.*

* cited by examiner

*Primary Examiner*—Rena L Dye
*Assistant Examiner*—James Yager
(74) *Attorney, Agent, or Firm*—Oblon, Spivak, McClelland, Maier & Neustadt, L.L.P.

(57) ABSTRACT

A composite sheet comprising at least one layer each of a substrate layer (layer A) made of a polystyrene resin and an ABS resin as the main components, a reinforcing layer (layer B) made of an ABS resin as the main component, and a surface layer (layer C) made of, as the main component, a polystyrene resin which contains a conductive filler, wherein the surface on at least one side is the above surface layer (layer C) is useful for a conductive composite sheet which has a small difference in physical properties between the machine and transverse directions and has high rigidity and folding endurance and which can easily be thermally formed into a tray or an embossed carrier tape.

15 Claims, No Drawings

CONDUCTIVE COMPOSITE SHEETING

CROSS REFERENCE TO RELATED APPLICATION

This application is a 371 of PCT/JP05/016277, filed on Sep. 5, 2005, and claims priority to Japanese Patent Application No. 2004-259136, filed on Sep. 7, 2004.

TECHNICAL FIELD

The present invention relates to a composite sheet, and the composite sheet is useful for packaging ICs disfavoring static electricity or various components having ICs.

BACKGROUND ART

A vacuum-formed tray, an embossed carrier tape or the like obtained by thermally forming a sheet is used as a packaging container for intermediate products for many industrial products such as electronic equipments or automobiles. And, as a sheet for a packaging container for ICs disfavoring static electricity or various components having ICs, a sheet having a polystyrene resin containing a conductive filler such as carbon black laminated on a substrate layer made of a polystyrene resin or an ABS resin, is used (e.g. Patent Documents 1 to 3). However, there has been drawbacks such that the rigidity is inadequate when a polystyrene resin is used for the substrate layer, and on the other hand, when an ABS resin is used, no adequate shaping property is obtainable at the time of forming the sheet into various containers by e.g. vacuum forming, and further when a polystyrene resin and an ABS resin are used in combination for the substrate layer, the difference in physical properties between the machine and transverse directions of the sheet tends to be large, and the mechanical properties in the transverse direction tend to substantially deteriorate.

Patent Document 1: JP-A-9-76422
Patent Document 2: JP-A-9-76425
Patent Document 3: JP-A-9-174769

DISCLOSURE OF THE INVENTION

Object to be Accomplished by the Invention

It is an object of the present invention to solve such problems and to provide a conductive composite sheet is which has high rigidity and folding endurance and which can easily be thermally formed into a tray or an embossed carrier tape.

Means to Accomplish the Object

The present invention is to accomplish the above object and provides the following.
(1) A composite sheet comprising at least one layer each of a substrate layer (layer A) made of a polystyrene resin and an ABS resin as the main components, a reinforcing layer (layer B) made of an ABS resin as the main component, and a surface layer (layer C) made of, as the main component, a polystyrene resin which contains a conductive filler, wherein the surface on at least one side is the above surface layer (layer C).
(2) The composite sheet according to the above (1), wherein the surface on both sides is the above surface layer (layer C).
(3) The composite sheet according to the above (1) or (2), which has a construction of the surface layer (layer C)/the reinforcing layer (layer B)/the substrate layer (layer A)/the surface layer (layer C), or the surface layer (layer C)/the reinforcing layer (layer B)/the substrate layer (layer A)/the reinforcing layer (layer B)/the surface layer (layer C).
(4) The composite sheet according to any one of the above (1) to (3), wherein the surface layer (layer C) is made of a composition containing from 2 to 100 parts by mass of carbon black per 100 parts by mass of the polystyrene resin.
(5) The composite sheet according to any one of the above (1) to (4), wherein the substrate layer (layer A) further contains from 0.1 to 50 parts by mass of at least one thermoplastic resin selected from a styrene/butadiene/butylenes/styrene block copolymer resin a styrene/diene block copolymer resin, a resin having a styrene/diene block copolymer hydrogenated and a resin having styrene graft-copolymerized to a polyolefin, per 100 parts by mass of the total amount of the polystyrene resin and the ABS resin.
(6) The composite sheet according to any one of the above (1) to (5), wherein the reinforcing layer (layer B) further contains from 0.1 to 50 parts by mass of at least one thermoplastic resin selected from a styrene/butadiene/butylenes/styrene block copolymer resin, a styrene/diene block copolymer resin a resin having a styrene/diene block copolymer hydrogenated, and a resin having styrene graft-copolymerized to a polyolefin, per 100 parts by mass of the total amount of the ABS resin.
(7) A packaging container using the composite sheet as defined in any one of the above (1) to (6).
(8) A package using the composite sheet as defined in any one of the above (1) to (6).

Effects of the Invention

The composite sheet of the present invention has a construction comprising a substrate layer (layer A) made of a polystyrene resin and an ABS resin as the main components, a reinforcing layer (layer B) made of an ABS resin as the main component, and a surface layer (layer C) made of, as the main component, a polystyrene resin which contains a conductive filler, whereby it becomes possible to provide a composite sheet which has a small difference in mechanical properties between the machine and transverse directions and has high rigidity and folding endurance and which can easily be formed into a packaging container by hot forming.

BEST MODE FOR CARRYING OUT THE INVENTION

Now, the present invention will be described in detail.

The polystyrene resin to be used in the present invention is a common polystyrene resin, an impact resistant polystyrene resin or a resin containing their mixture as the main component. The ABS resin is a resin containing, as the main component, a copolymer composed mainly of the three components of acrylonitrile/butadiene/styrene, and it may, for example, be a copolymer obtained by block- or graft-polymerizing at least one monomer selected from an aromatic vinyl monomer and a vinyl cyamide monomer, to a diene rubber, or a blend product of such a copolymer. Here, the diene rubber may, for example, be a polybutadiene, a polyisoprene, an acrylonitrile/butadiene copolymer or a styrene/butadiene copolymer. The aromatic vinyl monomer may, for example, be styrene, α-methylstyrene or various alkyl-substituted styrenes. The vinyl cyamide monomer may, for example, be acrylonitrile, methacrylonitrile or various halogen-substituted acrylonitriles. As a specific example of the above copolymer or the blend product of such a copolymer, an acrylonitrile/butadiene/styrene ternary copolymer or an acrylonitrile/styrene binary copolymer or a polymer alloy obtained by kneading such a copolymer with a polybutadiene, may, for example, be mentioned.

The styrene/butadiene/butylene/styrene block copolymer (hereinafter referred to as the SBBS copolymer) is a copolymer having the following chemical structural units (1), (2) and (3):

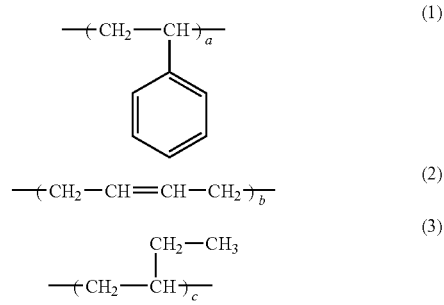

In the above (1), (2) and (3), a to c are symbols which simply show that the respective chemical structural units are repeated. So long as it is one having such a structure, its production method is not particularly limited. However, a method for producing such a resin is reported, for example, in "Structure and Performance of New Styrene Thermoplastic Elastomer (SBBS)", Shuji Tsukasa et al, 9th Polymer Material Forum, p. 125-126, 2000, JP-A-64-38402, JP-A-60-220147, JP-A-63-5402, JP-A-63-4841, JP-A-61-33132, JP-A-63541 JP-A-61-28507, and JP-A-61-57524. With respect to the SBBS copolymer, a commercial product may be used as it is.

The styrene content in the SBBS copolymer is preferably from 10 to 80 mass %, more preferably from 20 to 70 mass %, from the viewpoint of the dispersibility with other resin components at the time of melt-kneading. If such dispersibility deteriorates, the machine/transverse difference in the mechanical properties of the composite sheet obtained by the present invention will be large. Further, for the same reason, one having a melt flow index (190° C., 2.16 kgf) of from 1 to 9 g/10 min is preferred, and one having a melt flow index of from 2 to 6 g/10 min is more preferred.

Butadiene or isoprene is preferred as the diene for the styrene/diene block copolymer or a resin having such a styrene/diene block copolymer hydrogenated, to be used as a component for the substrate layer of the present invention. Here, the styrene content is preferably from 10 to 80 mass %, more preferably from 20 to 70 mass %, for the same reason as for the above-mentioned SBBS copolymer.

Likewise, the polyolefin for the resin having styrene graft-copolymerized to a polyolefin, to be used as a component for the substrate layer of the present invention, is a homopolymer or copolymer of ethylene or propylene, particularly preferably a polyethylene, polypropylene or an ethylene/vinyl acetate copolymer.

The substrate layer (layer A) of the composite sheet of the present invention contains the above-mentioned polystyrene resin and an ABS resin as the main components, wherein the proportion of the polystyrene resin is preferably from 2 to 50 parts by mass, more preferably from 5 to 30 parts by mass, per 100 parts by mass of the total amount of the polystyrene resin and the ABS resin. If the proportion of the polystyrene resin is less than 2 parts by mass, the shaping property tends to be inadequate when the obtained composite sheet is subjected to post-forming, and if it exceeds 50 parts by mass, the rigidity (tensile modulus of elasticity) of the composite sheet tends to be inadequate.

Carbon black may be added to the substrate layer in a small amount not to impair the fluidity, preferably within a range of from 0.1 to 30 parts by mass, particularly preferably from 0.1 to 10 parts by mass. By the addition of carbon black, the mechanical strength may be further improved, and it will be possible to solve such a problem that when the sheet is formed into a packaging container, the thickness of the sheet becomes thin, and a corner portion or the like of the formed product becomes see-through. The carbon black to be added to the substrate layer is not particularly limited, and conventional one such as furnace black, channel black or acetylene black may be employed.

To the substrate layer (layer A), other resin components may be added as modifying agents, and various additives such as a lubricant, a plasticizer and a processing adjuvant, may further be added as the case requires. Particularly, at least one thermoplastic resin selected from the group consisting of the above-mentioned SBBS copolymer resin, the styrene/diene block copolymer resin, the resin having such a styrene/diene block copolymer hydrogenated; and the resin having styrene graft-copolymerized to a polyolefin, may suitably be added. These resins may be added alone, or a plurality of them may be used at the same time. By adding such a thermoplastic resin, the impact strength may be improved, and at the same time, adhesion to the after-mentioned reinforcing layer (layer B) will be improved, whereby ply separation will be suppressed, or formation of fluff or powder from the sheet end face will be suppressed. The amount to be added is preferably from 0.1 to 50 parts by mass, more preferably from 0.1 to 20 parts by mass, per 100 parts by mass of the total amount of the polystyrene resin and the ABS resin. If it is less than 0.1 part by mass, the above-mentioned effect for improving the adhesion to the reinforcing layer (layer B) is likely to be inadequate, and if it exceeds 50 parts by mass, the rigidity (tensile modulus of elasticity) is likely to be inadequate.

The composite sheet of the present invention has at least one reinforcing layer (layer B) made of an ABS resin as the main component. Also to this ABS resin for the reinforcing layer, carbon black may be added in a small amount not to impair the fluidity, specifically within a range of from 0.1 to 30 parts by mass. By the addition of carbon black, it is possible to solve such a problem that when the sheet is formed into a packaging container, the thickness of the sheet becomes thin, and a corner portion or the like of the formed product becomes see-through. The type of carbon black is not particularly limited, and conventional one such as furnace black, channel black or acetylene black may be employed.

Further, to this reinforcing layer, other resin components may be added as modifying agents, and various additives such as a lubricant, a plasticizer and a processing adjuvant, may further be added as the case requires. Especially, at least one thermoplastic resin selected from the group consisting of the SEES copolymer resin, the styrene/diene block copolymer resin, the resin having such a styrene/diene block copolymer hydrogenated, and the resin having styrene graft-copolymerized to a polyolefin, may suitably be used. These resins may be added alone, or a plurality of them may be used at the same time. By the addition of such a thermoplastic resin, the impact strength may be improved, and at the same time, the adhesion to the substrate layer (layer A) or the after-mentioned surface layer (layer C) will be improved, whereby ply separation will be suppressed, or formation of fluff or powder from the sheet end face will be suppressed. The amount to be added is preferably from 0.1 to 50 parts by mass, more preferably from 0.1 to 20 parts by mass, per 100 parts by mass of the total amount of the polystyrene resin and the ABS resin, for the same reason as mentioned in the case of the substrate layer.

The composite sheet of the present invention has at least one surface layer (layer C) made of a polystyrene resin and carbon black as the main components. To the polystyrene resin to be used for this surface layer, it is possible to add, as a modifying agent, at least one other resin component such as the SBBS copolymer resin, the styrene/diene block copolymer resin, the resin having such a styrene/diene block copolymer hydrogenated, the resin having styrene graft-copolymerized to a polyolefin a polyolefin resin represented by a homopolymer or copolymer of ethylene or propylene as the main component, a polyester resin or an ABS resin. Further, various additives such as a lubricant, a plasticizer and a is processing adjuvant, may be added as the case requires.

As the olefin resin which may be added to the surface layer (layer C), a polyethylene resin, a polypropylene resin, an ethylene/α-olefin resin, an ethylene/vinyl acetate copolymer resin, and an ethylene/ethyl acrylate copolymer resin, may, for example, be mentioned. As a typical example of the polyester resin, a polyethylene terephthalate resin or a polybutylene terephthalate resin may, for example, be mentioned A conductive filler such as metal fiber, carbon fiber or carbon black, may be added to the surface layer in order to impart electroconductivity as a packaging container. It is particularly preferred to employ carbon black from the viewpoint of the dispersibility and the moldability of the sheet by extrusion.

The carbon black may, for example, be furnace black, channel black or acetylene black and preferably one having a large specific surface area, whereby high electroconductivity can be obtained with a small amount of addition to the resin. For example, S.C.F. (Super Conductive Furnace), E.C.F. (Electric Conductive Furnace), Ketjen black (tradename, manufactured by Lion-AKZO K.K.) or acetylene black may, for example, be mentioned. The amount to be added is preferably an amount whereby the surface resistivity can be made to be from $10^2$ to $10^{10}\Omega$ from 1 to 50 mass % of carbon black based on 100 mass % of the total amount of the composition of the surface layer. If the amount to be added is less than 1 mass %, no adequate electroconductivity tends to be obtained, and the surface resistivity tends to increase, and if it exceeds 50 mass %, uniform dispersibility with the resin tends to deteriorate, the molding processability tends to remarkably deteriorate, and the property values such as mechanical strength tend to deteriorate.

The composite sheet of the present invention has at least one layer each of the above-mentioned substrate layer (layer A), the reinforcing layer (layer B) and the surface layer (layer C) Specifically, the following constructions may be mentioned.
(1) Layer C/layer B/layer A
(2) Layer C/layer A/layer B
(3) Layer C/layer B/layer A/layer B
(4) Layer C/layer B/layer A/layer C
(5) Layer C/layer B/layer A/layer B/layer C
(6) Layer C/layer A/layer B/layer A/layer C In the above constructions (1) to (6), by the presence of layer B, the difference in physical properties between the machine direction and the transverse direction of the sheet will be reduced, and post-formability will also be improved. Among these constructions, constructions (4) to (6) wherein the surface on both sides of the composite sheet has electroconductivity, are preferred with a view to eliminating a problem of static electricity Construction (5) has a symmetric construction in the thickness direction of the sheet and thus is more preferred from the viewpoint of the physical properties and post-formability in addition to the above-mentioned elimination of a problem of static electricity.

The overall thickness of the composite sheet of the present invention is preferably from 0.1 to 3.0 mm, more preferably from 0.15 to 2.0 mm. Particularly, one having an overall thickness of from 0.15 to 0.6 mm may be post-formed into an embossed carrier tape and thus suitably used as a sheet for packaging electronic components. Further, one having an overall thickness of from 0.5 to 2.0 mm may be post-formed into a tray and thus suitably used as a sheet for packaging to accommodate electronic components or mechanical components. The thickness of the substrate layer (layer A) in the overall thickness is preferably from 2 to 50%, more preferably from 5 to 25%. Further, the thickness of the surface layer (layer C) in the overall thickness (in a case where the surface layer is present on each side, the thickness of each surface layer) is preferably from 1 to 20%. The components to be packaged are not particularly limited.

Sheets or films constituting the respective layers of the composite sheet of the present invention may be formed by a conventional method such as extrusion or calendering. The sheets or films for the respective layers are laminated to form any one of the above-mentioned layered structures (1) to (6) thereby to obtain a composite sheet of the present invention. The method for lamination is not particularly limited, and the sheets or films for the respective layers may sequentially be laminated by e.g. a hot lamination method, a dry lamination method and/or an extrusion lamination method, which is commonly employed. From an economical viewpoint, it is preferred to employ a multilayer coextrusion method using a multi manifold die or feed block to obtain a laminated composite sheet all at once.

Using the composite sheet obtained as described above, packaging containers of various shapes for electronic components can be obtained by molding by a conventional method such as vacuum forming, air-pressure forming or press molding. Such containers are excellent in mechanical strength and, in particular, have a small difference in physical properties between the machine direction and the transverse direction, whereby they are useful particularly as carrier tapes for packaging fine electronic components.

EXAMPLES

Now, the present invention will be described in further detail with reference to Examples.

Examples 1 to 3

Materials for the surface layer in the proportions as shown in Table 1, were uniformed mixed by a high-speed mixer, then kneaded by means of a Φ45 mm vented twin-screw extruder and pelletized by a strand cut method. Then, together with the resin composition for the reinforcing layer and the resin composition for the substrate layer uniformly mixed by a mixer in the proportions as shown in Table 1, the pelletized resin composition for the surface layer, was formed into a sheet having a thickness of 0.3 mm, wherein the ratio of the respective layers is as shown in Table 1, by means of a Φ65 mm extruder (L/D=28), a Φ40 mm, extruder (L/D=26), a feed block and a T-die.

Comparative Examples 1 and 2

The operation was carried out in the same manner as in Example 1 except that materials in the proportions as shown in Table 1 were used. The evaluation results of the respective Examples and Comparative Examples are shown in Table 2.

Evaluation was carried out by the following methods.
(1) Folding endurance: In accordance with JIS-P-8115 (2001), evaluation was carried out under a load of 500 g at an angle of 135°.
(2) Tensile properties: In accordance with JIS-K-7127 (1999) No. 4 evaluation was carried out.

A: Breaking elongation
B: Yield strength
C: Breaking strength
D: Tensile modulus of elasticity
(3) Surface resistivity: Using mega ohm meter Model-800 (manufactured by ETS Co.), three points in the transverse direction of the sheet were measured, and the logarithmic average value was taken as the surface resistivity.
(4) DuPont impact strength: Using a DuPont impact tester, manufactured by TOYOSEIKI K.K., a load of 300 g, 500 g or 1 kg was dropped to obtain a 50% breaking height, and an energy value was calculated from the load at that time. The calculation was carried out in accordance with JIS K-7211.
(5) Moldability: By an air-pressure embossed tape-forming machine manufactured by EDG Co., an embossed carrier tape having a width of 24 mm was formed, and five-stage evaluation was carried out on such a basis that one having a good shaping property was rated to be 5, and one having a poor shaping property was rated to be 1.
(6) Slit end face evaluation: A sheet obtained by a shear cut method was slit in a width of 24 mm, and the cut face was inspected by a stereomicroscope and five-stage evaluation was carried out on such a bases that one having less formation of flash was rated to be 5, and one having substantial formation of flash was rated to be 1.

Each of Examples is superior to Comparative Examples in the strength and slit-forming property.
Here, the resins used in the respective Examples and Comparative Examples are as shown below.
ABS resin: Denka ABS SE-10 (tradename of Denki Kagaku Kogyo K.K.)
Polystyrene resin: TOYOSTYROL HI-SQ (tradename of Toyo-Styrene Co., Ltd.)
Carbon black: Denka Black Granular (tradename of Denki Kagaku Kogyo K.K.)
Styrene/butadiene/butylene/styrene block copolymer: TUFTEC P-2000 (tradename of Asahi Kasei Corporation)
Resin having a styrene/diene block copolymer hydrogenated: TUFTEC H-1043 (tradename of Asahi Kasei Corporation)
Ethylene/ethyl acrylate copolymer: NUC copolymer DPDJ-6169 (tradename of Nippon Unicar Co., Ltd.)

INDUSTRIAL APPLICABILITY

A vacuum-formed tray, an embossed carrier tape, etc. obtainable by thermally forming the composite sheet of the present invention, are useful widely as packaging containers for e.g. intermediate products in the fields of e.g. electronic equipments or automobiles.

TABLE 1

| | | Grade | Ex. 1 | Ex. 2 | Ex. 3 | Comp. Ex. 1 | Comp. Ex. 2 |
|---|---|---|---|---|---|---|---|
| Blend ratio (parts by mass) | Substrate layer | HI-SQ | 16 | 16 | 16 | 16 | 14 |
| | | SE-10 | 80 | 80 | 80 | 80 | 84 |
| | | P-2000 | | | 5 | | |
| | | H-1043 | | | 5 | 5 | 5 |
| | | Dena Black granular | 4 | 4 | | 4 | 2 |
| | Reinforcing layer | SE-10 | 100 | 100 | 100 | — | — |
| | Surface layer | HI-SQ | 62 | 62 | 62 | 62 | 62 |
| | | DPDJ6169 | 15 | 15 | 15 | 15 | 15 |
| | | P-2000 | | | 5 | | |
| | | H-1043 | 5 | | 5 | 5 | 5 |
| | | Denka Black granular | 18 | 18 | 18 | 18 | 18 |
| Layer constituting ratio (%) | Surface layer | | 10 | 10 | 10 | 10 | 10 |
| | Reinforcing layer | | 35 | 35 | 35 | | |
| | Substrate layer | | 10 | 10 | 10 | 80 | 80 |
| | Reinforcing layer | | 35 | 35 | 35 | | |
| | Surface layer | | 10 | 10 | 10 | 10 | 10 |

TABLE 2

| | Folding endurance (times) | | Breaking elongation (%) | | Yield strength (Mpa) | | Breaking strength (Mpa) | | Tensile modulus (Mps) | | DuPont impact strength (J) | Moldability 5 stage evaluation | Slit end face evaluation |
|---|---|---|---|---|---|---|---|---|---|---|---|---|---|
| | MD | TD | MD | TD | MD | TD | MD | TD | MD | TD | | | |
| Ex. 1 | 664 | 254 | 212 | 71 | 45 | 44 | 40 | 33 | 1970 | 1970 | 0.94 | 5 | 4 |
| Ex. 2 | 985 | 325 | 212 | 114 | 46 | 45 | 40 | 35 | 1970 | 1970 | 1.41 | 5 | 5 |
| Ex. 3 | 857 | 436 | 488 | 109 | 46 | 45 | 38 | 34 | 1970 | 1960 | 1.38 | 5 | 5 |
| Comp. Ex. 1 | 1352 | 9 | 146 | 16 | 38 | 34 | 32 | 29 | 1740 | 1550 | 0.66 | 5 | 2 |
| Comp. Ex. 2 | 1672 | 992 | 231 | 26 | 37 | 33 | 36 | 28 | 1630 | 1590 | 1.31 | 5 | 3 |

MD: Machine direction,
TD: Transverse direction

The entire disclosure of Japanese Patent Application No. 2004-259136 filed on Sep. 7, 2004 including specification, claims and summary is incorporated herein by reference in its entirety.

The invention claimed is:

1. A composite sheet, comprising:
a substrate layer (A) comprising a polystyrene resin and an ABS resin as the main components, and from 0.1 to 20 parts by mass of a thermoplastic resin that is a styrene/butadiene/butylenes/styrene block copolymer resin having a styrene content of from 10 to 80 mass %, per 100 parts by mass of the total amount of the polystyrene resin and the ABS resin,
a reinforcing layer (B) consisting of an ABS resin, and
a surface layer (C) comprising, as the main component, a polystyrene resin which comprises a conductive filler, wherein
a surface of each side of said composite sheet is a surface layer (C), and
said substrate layer (A) comprises said polystyrene resin in an amount of from 5 to 30 parts by mass per 100 parts by mass of the total amount of said polystyrene resin and said ABS resin.

2. The composite sheet according to claim 1, which has a construction of the surface layer (C)/the reinforcing layer (B)/the substrate layer (A)/the surface layer (C), or
the surface layer (C)/the reinforcing layer (B)/the substrate layer (A)/the reinforcing layer (B)/the surface layer (C).

3. The composite sheet according to claim 1, wherein said surface layer (C) is made of a composition comprising from 2 to 100 parts by mass of carbon black per 100 parts by mass of the polystyrene resin.

4. A packaging container comprising the composite sheet as defined in claim 1.

5. A package comprising the composite sheet as defined in claim 1.

6. The composite sheet according to claim 1, wherein said substrate layer (A) further comprises from 0.1 to 30 parts by mass of carbon black.

7. The composite sheet according to claim 1, wherein the thickness of said sheet is 0.1 to 3.0 mm.

8. The composite sheet according to claim 7, wherein the thickness of said substrate layer (A) is from 2 to 50% of said thickness of said sheet.

9. The composite sheet according to claim 7, wherein the thickness of said surface layer (C) is from 1 to 20% of said thickness of said sheet.

10. The composite sheet according to claim 7, wherein the thickness of said substrate layer (A) is from 2 to 50% and the thickness of said surface layer (C) is from 1 to 20%, each relative to said thickness of said sheet.

11. The composite sheet according to claim 1, wherein said styrene/butadiene/butylenes/styrene block copolymer resin has chemical structural units (1), (2) and (3):

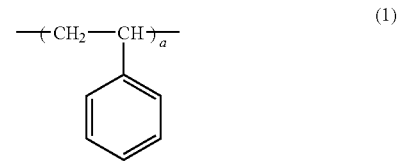

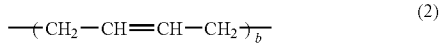

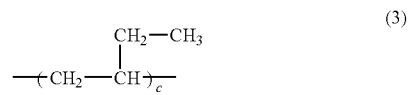

where a, b, and c are symbols which show that the chemical structural units are repeated.

12. The composite sheet according to claim 1, wherein said styrene/butadiene/butylenes/styrene block copolymer resin has a styrene content of from 20 to 70 mass %.

13. The composite sheet according to claim 1, wherein said styrene/butadiene/butylenes/styrene block copolymer resin has a melt flow index of from 1 to 9 g/10 min, measured at 190° C., 2.16 kgf.

14. The composite sheet according to claim 1, wherein said styrene/butadiene/butylenes/styrene block copolymer resin has a melt flow index of from 2 to 6 g/10 min, measured at 190° C., 2.16 kgf.

15. The composite sheet according to claim 1, wherein the thermoplastic resin of substrate layer (A) does not contain a resin which is
a hydrogenated styrene/butadiene block copolymer, or
a hydrogenated styrene/isoprene block copolymer.

* * * * *